(12) United States Patent
Rawat et al.

(10) Patent No.: US 11,689,963 B2
(45) Date of Patent: Jun. 27, 2023

(54) DATA PRE-FETCH UPON IMMINENT WIFI LINK LOSS

(71) Applicant: APPLE INC., Cupertino, CA (US)

(72) Inventors: Abhishek Rawat, Fremont, CA (US); Chaitanya Mannemala, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/969,289

(22) Filed: May 2, 2018

(65) Prior Publication Data

US 2019/0098532 A1 Mar. 28, 2019

Related U.S. Application Data

(60) Provisional application No. 62/564,397, filed on Sep. 28, 2017.

(51) Int. Cl.
| | |
|---|---|
| *H04W 28/04* | (2009.01) |
| *H04W 28/02* | (2009.01) |
| *H04W 76/30* | (2018.01) |
| *H04W 24/08* | (2009.01) |
| *H04W 84/12* | (2009.01) |
| *H04W 88/02* | (2009.01) |
| *H04W 24/04* | (2009.01) |
| *H04W 36/30* | (2009.01) |
| *H04W 36/00* | (2009.01) |
| *H04W 36/24* | (2009.01) |

(52) U.S. Cl.
CPC ....... *H04W 28/04* (2013.01); *H04W 28/0226* (2013.01); *H04W 28/0236* (2013.01); *H04W 76/30* (2018.02); *H04W 24/04* (2013.01); *H04W 24/08* (2013.01); *H04W 36/0016* (2013.01); *H04W 36/245* (2013.01); *H04W 36/30* (2013.01); *H04W 84/12* (2013.01); *H04W 88/02* (2013.01)

(58) Field of Classification Search
CPC . H04W 28/04; H04W 76/30; H04W 28/0226; H04W 28/0236; H04W 24/04; H04W 24/08; H04W 36/0016; H04W 36/245; H04W 36/30; H04W 84/12; H04W 88/02
See application file for complete search history.

(56) References Cited

U.S. PATENT DOCUMENTS

| | | | | |
|---|---|---|---|---|
| 2012/0096144 A1* | 4/2012 | Ledlie | ................... | H04L 12/56 709/224 |
| 2015/0256641 A1* | 9/2015 | Agarwal | ................. | H04L 67/02 709/203 |

* cited by examiner

*Primary Examiner* — Eric Myers
(74) *Attorney, Agent, or Firm* — Fay Kaplun & Marcin, LLP (57) ABSTRACT

A method performed by a device that has a current first network connection to a first network. The device determining one or more current conditions associated with the device, determining whether a disconnect of the first network connection is imminent based on the one or more current conditions and responsive to determining that the disconnect is imminent, performing a pre-fetch operation to request data over the first network connection for at least one application resident on the device.

20 Claims, 3 Drawing Sheets

DATA PRE-FETCH UPON IMMINENT WIFI LINK LOSS

PRIORITY/INCORPORATION BY REFERENCE

This application claims priority to U.S. Provisional Application 62/564,397 entitled "Data Pre-Fetch When WiFi Link Loss Imminent," filed on Sep. 28, 2017, the entirety of which is incorporated herein by reference.

BACKGROUND INFORMATION

A user equipment (UE) may be configured to establish a connection to at least one of a plurality of different networks or types of networks to perform a variety of different functionalities via the connection. For example, the UE may connect to a first type of network (e.g., a Long Term Evolution (LTE) network) to communicate with another UE through the network connection (e.g., a user of the UE may perform a voice call or transmit a text to a user of another UE). In another example, the UE may connect to a second type of network (e.g., a WiFi network) and perform various functionalities using this connection, such as receiving browser and/or application data.

Those skilled in the art will understand that the cellular network typically provides a greater coverage area than a WiFi network. The WiFi connection may provide a higher rate of data exchange in the more limited operating area such that the UE is capable of receiving and/or transmitting at a greater data rate, thereby improving a user experience. Furthermore, the WiFi connection may not have data restrictions. For example, the user of the UE may have agreed to terms with a service provider of the cellular network where, in exchange for a base subscription fee, a maximum amount of data may be exchanged over a period of time (e.g., a month) and any additional data exchanged is charged additional fees over the base subscription fee. To reduce the amount of data exchanged over the cellular connection and to optimize the data exchange of the UE by utilizing any other available higher rate of data exchange, the UE may prioritize the WiFi connection over the cellular connection whenever available. However, conventional network operations simply revert to the cellular connection when the UE disconnects from the WiFi connection.

SUMMARY

In one exemplary embodiment, q method performed by a device that has a current first network connection to a first network is described. The method includes determining one or more current conditions associated with the device, determining whether a disconnect of the first network connection is imminent based on the one or more current conditions and responsive to determining that the disconnect is imminent, performing a pre-fetch operation to request data over the first network connection for at least one application resident on the device.

In another exemplary embodiment, a device having a transceiver configured to establish a first network connection to a first network and a processor is described. The processor is configured to determine one or more current conditions of the device, the one or more current conditions comprising at least one of a quality of the first network connection or a context of the device, determine whether a disconnect of the first network connection is imminent based on the one or more current conditions, and when the disconnect is determined to be imminent, perform a pre-fetch operation to request data over the first network connection for at least one application executing on the device.

In a still further exemplary embodiment, a device having a current first network connection to a first network is described. The device has circuitry for determining one or more current conditions of the device, the one or more current conditions comprising at least one of a quality of the first network connection or a context of the device, circuitry for determining whether a disconnect of the first network connection is imminent based on the one or more current conditions and responsive to determining that the disconnect of the first network connection is imminent, circuitry for performing a pre-fetch operation to request data over the first network connection for at least one application executing on the device.

DETAILED DESCRIPTION

The exemplary embodiments may be further understood with reference to the following description and the related appended drawings, wherein like elements are provided with the same reference numerals. The exemplary embodiments are related to a user equipment (UE) performing a pre-fetch operation to download data in a preparatory (or anticipatory) manner for one or more select applications over a first data exchange rate connection prior to disconnecting therefrom and subsequently connecting to a second, lower data exchange rate connection. Specifically, the exemplary embodiments are described herein where the pre-fetch operation is performed upon a determination that the UE may imminently disconnect from a WiFi connection, e.g., within a predetermined amount of time and connect to a cellular network. As will be described in further detail below, the pre-fetch operation may enable the UE to exchange data over the WiFi connection, where the cellular connection would have otherwise been used.

The exemplary embodiments are described with the term "imminent" associated with when a UE disconnects from a WiFi network. However, the term "imminent" is used herein as a timeframe that is within a predetermined amount of time and not necessarily as an immediate event that will occur. The predetermined amount of time may be any relative window of time from microseconds, milliseconds, seconds, minutes, etc. Further, an imminent disconnection need not occur. Instead, channel conditions suggesting the possibility and/or likelihood of a disconnection from WiFi can trigger the anticipatory downloading.

Initially, it is noted that the exemplary embodiments are described with regard to the UE having established a WiFi connection and determining whether the UE will imminently disconnect from the WiFi connection and revert to a cellular connection. However, the WiFi and cellular connections are only exemplary. The exemplary embodiments may be utilized with any first connection in circumstances suggesting reversion to any second connection that is characterized by one or more less favorable aspects, such as a lower rate of data exchange than the first connection and/or a higher cost than the first connection. For example, the first connection may be associated with a HotSpot and the second connection may be associated with a cellular connection. In fact, the exemplary embodiments do not require that the first and second connections be different types of networks. For example, the first connection may be a first WiFi network and the second network may be a second, different WiFi network that has a lower rate of data exchange than the first WiFi network. In a further example, the first connection may be to a cellular network, such as an LTE network or a 5G network, and the second connection may be to a legacy cellular network, such as a 3G or GSM network, that typically has a lower rate of data exchange than an LTE or 5G cellular network. Thus, the WiFi network may represent any first network and the cellular network may represent any second network where the first network supports a higher data exchange rate than the second network.

It is also noted that the exemplary embodiments are described with regard to the UE performing a pre-fetch operation. However, the pre-fetch operation of downloading data in a preparatory manner for a select application is only exemplary. The exemplary embodiments may be utilized to perform any operation associated with a first, present condition of the UE (e.g., a current network connection) prior to the first condition ending and a second condition becoming present (e.g., a subsequent network connection). Thus, the pre-fetch operation may represent any operation that is performed in this preparatory manner while the first condition is still available and determined to likely end in a predetermined amount of time.

It is further noted that the exemplary embodiments are described with regard to the UE establishing a subsequent connection to a cellular network. However, the connection to a subsequent lower data exchange rate connection is only exemplary. The exemplary embodiments may be utilized to perform the pre-fetch operation whenever a current condition is determined to imminently end (e.g., disconnect from a current network). That is, the exemplary embodiments do not require that UE will also connect to a lower data exchange rate connection upon disconnecting from the higher data exchange rate connection. For example, the UE may determine that the first connection is likely to be terminated, but the second connection to a further network is not likely to be completed contemporaneously with (or before) the disconnection from the first network.

The exemplary embodiments provide a mechanism in which an opportunistic pre-fetch operation is performed as a background operation when a determination is made of a condition that a WiFi link loss is imminent. Accordingly, the UE may take advantage of a scenario where a data exchange is to be performed and a currently existing high data exchange rate connection is used instead of a subsequent potentially low data exchange rate or more expensive connection. As will be described in further detail below, the pre-fetch operation of data for select applications may be performed based on certain criteria directed to a quality, a change in quality, and/or a historical usage associated with the WiFi network. Accordingly, a probability or likelihood that a WiFi link loss is imminent may be determined to trigger the pre-fetch operation.

Figure 1:
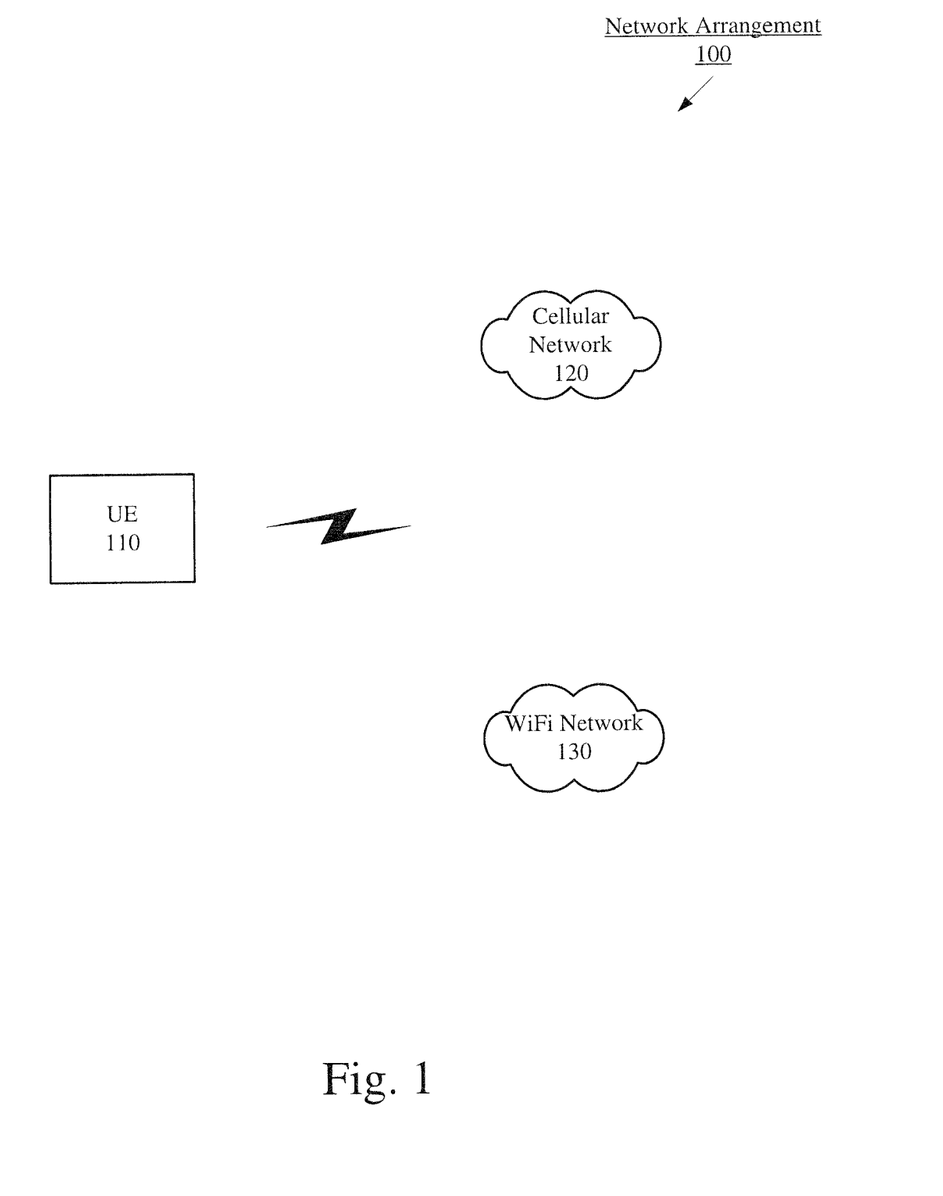
FIG. 1 shows an example network arrangement according to various exemplary embodiments described herein.

FIG. 1 shows a network arrangement 100 according to the exemplary embodiments. The network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Cat-M devices, Cat-M1 devices, MTC devices, eMTC devices, etc. It should also be understood that an actual network arrangement may include any number of UEs being used by any number of users and being associated with any number of these users where the user may be associated with one or more of the UEs.

The UE 110 may be configured to communicate with one or more networks. In this example, the networks with which the UE 110 may wirelessly communicate include a cellular network 120 and a WiFi network 130. However, it should be understood that the UE 110 may also communicate with other types of networks and/or other networks of the same type. The UE 110 may establish a connection with both the cellular network 120 and the WiFi network 130. For example, the UE 110 may have a legacy chipset, an LTE chipset, a WiFi chipset, etc. that are used to communicate with the corresponding one of the cellular network 120 and the WiFi network 130. The use of the two networks 120, 130 is only exemplary and there may be any other number of networks with which the UE 110 may communicate.

The cellular network 120 may be any legacy radio access network (RAN), a Long Term Evolution RAN, a 4G network, a 5G network, etc. The cellular network may be deployed by one or more cellular providers (e.g., Verizon, AT&T, Sprint, T-Mobile, etc.). The cellular network 120 may include, for example, base client stations (e.g., Node Bs, eNodeBs, HeNBs, gNBs, etc.) that are configured to send and receive traffic from UEs that are equipped with the appropriate cellular chip set. The WiFi network 130 may be any wireless local area network (WLAN) and may be any type of WLAN (e.g., WiFi, Hot Spot, IEEE 802.11x networks, etc.).

Those skilled in the art will understand that the network arrangement 100 may include a variety of other components. For example, the network arrangement 100 may also include a cellular core network, the Internet, an IP Multimedia Subsystem (IMS), a network services backbone, etc. These further components may provide their respective functionalities as those skilled in the art will understand. The network arrangement 100 may also include sources of data for the UE 110. For example, website servers, email host servers, streaming servers, etc. may be included in the network arrangement 100 that may provide data to the UE 110. These data sources may provide data requested in the pre-fetch operation according to the exemplary embodiments.

The exemplary embodiments relate to the UE 110 having a current connection to the WiFi network 130, which may subsequently be disconnected. Upon disconnection, the UE 110 may connect to the cellular network 120 or have no network connection for data exchanges. It should also be noted that the UE 110 may have a simultaneous connection to the WiFi network 130 and the cellular network 120, in which case, the UE 110 may prioritize the WiFi connection for data exchanges.

Figure 2:
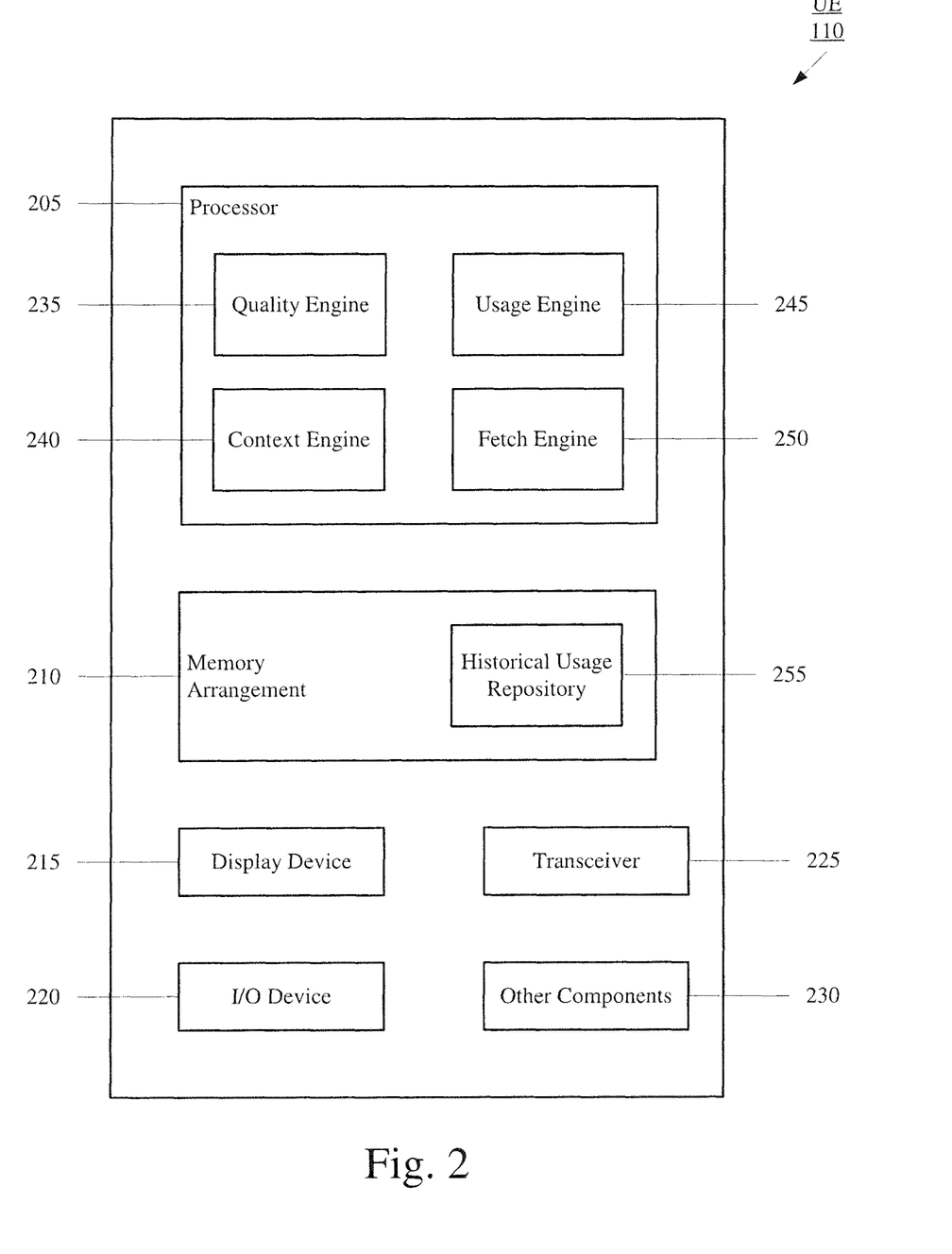
FIG. 2 shows an example user equipment according to various exemplary embodiments described herein.

FIG. 2 shows the UE 110 of the network arrangement 100 of FIG. 1 according to the exemplary embodiments. Specifically, the UE 110 is configured to execute a plurality of engines that perform functionalities to determine when the UE 110 may imminently disconnect from the WiFi network 130 and to perform a pre-fetch operation prior to disconnection when this condition is identified.

The UE 110 may represent any electronic device that is configured to wirelessly exchange data with the WiFi network 130 and/or the cellular network 120 (examples of which are noted above). The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, one or more ports to electrically connect the UE 110 to other electronic devices, etc.

The processor 205 may be configured to execute a plurality of applications and/or engines of the UE 110. For example, the applications may include user interaction applications (e.g., word processor, web browser, streaming application, email client, a map application, etc.). The applications may utilize a network connection to exchange data. In a first example, the word processor application may have a document opened and currently being edited by the user on the UE 110. However, the data of the document may be stored in a remote repository. Accordingly, whenever a manual save operation is performed, the network connection may be used to update the data of the document in the remote repository. The word processor may also be configured with an auto-save operation that may update the data of the document in the remote repository and/or in a local storage. In a second example, a web browser or application may include personalized settings such as a news feed that provides current or desired news items to be presented on the device. In providing these news items, the web browser may query news data sources over the network connection. In a third example, the streaming application may receive media data (e.g., video and/or audio) from a streaming provider for output on the UE 110. One manner of streaming the media data may be to receive upcoming content in sets of data blocks. Thus, based on a replay time index, the streaming application may query the streaming provider for the appropriate upcoming media content over the network connection. In a fourth example, the email client may update the emails in the inbox and/or outbox of the application when manually instructed to perform this operation or in an automated manner, e.g., based on one or more predefined settings. Thus, the email client may exchange email data over the network connection to maintain a current inbox and/or outbox. In a fifth example, the map application may be used to provide directions (e.g., while driving) or other map information. The map application may exchange map information with a map server for position related data or map data over the network connection. Those skilled in the art will understand that there may be any number of applications that may be running on the UE 110 either from being manually executed by the user or from being automatically executed by the UE 110 (e.g., upon startup). The exemplary embodiments may be implemented for any application for which the pre-fetch operation may be applicable.

It is noted that the applications may have different priorities on an individual level or as a set of applications. As a set, the applications may have a priority based on whether the applications are running in the foreground or in the background. For example, the streaming application may be executed by the processor 205 and may be replaying media content. Accordingly, the streaming application may have a higher priority than an application only running in a background capacity (e.g., the email client). In another example, when a plurality of applications are running in the foreground (or in the background), the application that is currently being utilized, e.g., by the user, may have a higher priority than another foreground running application that is not currently being utilized. In this manner, there may be priorities that are automatically set among the different available applications based on type of application and/or its corresponding use relative to the other applications.

On an individual level, an application may have a dynamic priority. For example, the email client may be updating at predetermined intervals of time, regardless of whether it is being run in the foreground or the background. However, if the email client is being run in the foreground (e.g., the user is composing a new email), the email client may have a higher priority than if the email client is only running updating operations in the background. In this manner, the applications may each have a dynamically set priority that is automatically set based on the respective application's corresponding use at a given time. It is noted that the priorities among the applications as a set or on an individual level may also be set manually (e.g., by an administrator or by the user). Thus, an application that is in the background may still have a higher priority than an application running in the foreground or an identified application may always have a preset priority, if indicated as such.

With regard to engines being executed by the processor 105 of the UE 110, the engines may include any/all of a quality engine 235, a usage engine 245, a context engine 240, and a fetch engine 250. As will be described in further detail below, the quality engine 235 may be configured to determine a quality of a current network connection. Specifically, the quality engine 235 may measure the quality of the current WiFi connection to the WiFi network 130 based on one or more network parameters. The context engine 240 may be configured to determine a current context of the UE 110. The context engine 240 may identify one or more other metrics of the UE 110 that are not directly associated with the network connection, such as a motion, a relative position, a location, a time, etc. The usage engine 245 may be configured to determine patterns associated with use of a particular WiFi network 130. Specifically, the usage engine 245 may identify particular conditions and/or criteria that exist in patterns from a historical use associated with a WiFi connection corresponding to a WiFi network 130. The patterns may be associated with the quality of the network connection and/or the non-network connection metrics. The fetch engine 250 may be configured to identify one or more select applications to perform the pre-fetch operation when the pre-fetch operation is triggered based on the outputs of the quality engine 235 and/or the usage engine 245.

In some implementations, the engines 235-250 and applications alternatively may also be represented as components of one or more multifunctional programs, a separate incorporated component of the UE 110, or may be a modular component coupled to the UE 110, e.g., an integrated circuit with or without firmware. That is, the applications/engines may be implemented in a variety of manners in hardware, software, firmware, or any combination thereof. For example, the integrated circuit may include input circuitry to receive signals and processing circuitry to process the signals and other information. In addition, in some UEs, the functionality described for the processor 205 is split among two or more processors, e.g., a baseband processor and an applications processor. The exemplary embodiments may be implemented in any of these or in any other configurations of a UE.

The memory 210 may be a hardware component configured to store data related to operations performed by the UE 110. As will be described in further detail below, in addition to other types of data, the memory 210 may store a historical usage repository 255. As noted above, the usage engine 245 may identify whether current conditions of the UE 110 indicate that the UE 110 may potentially and imminently disconnect from the WiFi network 130. For example, current conditions, as characterized by one or more performance metrics, may indicate or otherwise suggest that the connection to the WiFi network is becoming degraded and may fail in the immediate future (e.g., within seconds, tens of seconds, a minute, etc.). In some implementations, the usage engine 245 may base this determination on historical usage patterns. These historical usage patterns may correspond to WiFi networks in general (e.g., based on an average usage determination) or correspond to a particular WiFi network (e.g., based on usage with only the currently connected WiFi network). The historical usage repository 255 may be populated with instances that the UE 110 connects and disconnects from different WiFi networks. Again, the historical usage repository 255 may be populated with network quality information and/or non-network connection related metrics.

The display device 215 may be a hardware component configured to show data to a user while the I/O device 220 may be a hardware component that enables the user to enter inputs. It should be noted that the display device 215 and the I/O device 220 may be separate components or integrated together, such as a touchscreen. The transceiver 225 may be a hardware component configured to wirelessly exchange data with the networks, e.g., a base station associated with the cellular network 120, an access point of the WiFi network 130, etc.

As described above, the quality engine 235 may be configured to determine a quality measure associated with a current connection to the WiFi network 130 based on a network metric. The quality engine 235 may provide a first output to the fetch engine 250 regarding the network connection itself. In performing its functionality, the quality engine 235 may be configured to measure one or more network parameters that may indicate the quality of the network connection to the WiFi network 130. The quality engine 235 may measure the one or more network parameters at any time while connected to the WiFi network 130. For example, the quality engine 235 may continuously or intermittently monitor the network connection. In another example, the quality engine 235 may measure the one or more network parameters at predetermined or dynamic time intervals (e.g., every 100 ms, every 3 seconds, etc.). The time intervals may be defined based on one or more of various factors, such as remaining power supply, historical usage if the network connection is in a known WiFi network, etc. In a further example, the quality engine 235 may measure the network parameters upon the occurrence of an event (e.g., a change in position of the UE 110).

The quality engine 235 may measure the quality metric based on any type(s) of network parameter. For example, the network parameter may include one or more of a received signal strength indication (RSSI) value, a received signal received quality (RSRQ) value, a received signal received power (RSRP) value, a power headroom, a block error rate (BLER), etc. In another example, the network parameter may be based on one or more Layer 2 statistics (e.g., of the OSI model) from a WiFi chip of the transceiver 225. The Layer 2 statistics may include, for example, one or more of a transmission packet error rate (TxPER), a Beacon PER from the WiFi router, a retransmission rate (ReTx), a forward retransmission rate (FwReTx), a received PHY rate (RxPhyRate), received retries (RxRetries), etc. Based on one or a combination of these network parameters, the quality engine 235 may provide, to the fetch engine 250, a first output of one or more quality metrics that may indicate a measure of a quality of the network connection to the WiFi network. It should also be noted that the quality engine 235 is not required to directly measure the quality metric. For example, the quality engine may receive as an input the measure of the quality metric from another component of the UE 110. In another example, the WiFi network 130 may send the quality metric to the UE 110 to be used by the quality engine 235.

The context engine 240 may be configured to determine context information of the UE 110 by identifying one or more non-network connection related metrics of the UE 110. The context engine 240 may identify where the UE 110 is located (e.g., a global positioning system (GPS) location), what time the measurements are being determined (e.g., clock time, amount of time the UE 110 has been connected to the WiFi network 130, etc.), and/or any position/positional change information (e.g., MotionState, InCar, etc.). As noted above, the UE 110 may include other components 130 that may be configured to determine these context metrics (e.g., a GPS component, a clock, a timer, an accelerometer, etc.). In this manner, the context engine 240 may provide the relative context surrounding the UE 110, which may also be used (individually or in combination with the output of the quality engine 235) to identify whether the UE 110 may imminently disconnect from the WiFi network 130. Accordingly, the context engine 240 may provide a second output of one or more context metrics corresponding to context information to the fetch engine 250.

The usage engine 245 may be configured to determine patterns associated with use of a particular WiFi network 130 by identifying particular conditions or criteria that exist in the patterns from a historical use associated with a WiFi connection corresponding to a WiFi network 130. The patterns may be associated with the quality metric and/or the context metrics. As noted above, the historical usage repository 255 may be populated with average usage information while the UE 110 is connected to WiFi networks in general as well as to specific usage information while the UE 110 is connected to a particular WiFi network 130. In tracking the quality metric, the context metric, and/or some combination thereof, the usage engine 245 may identify one or more patterns that may indicate when the UE 110 may imminently disconnect from a currently connected WiFi network.

The usage engine 245 may utilize any manner of identifying the patterns associated with usage of one or more WiFi connections. The patterns may indicate a value or threshold specific to the user and/or the UE 110 of when the UE 110 disconnects from a particular WiFi network 130 or generally from WiFi networks 130. Accordingly, when applicable, the usage engine 245 may provide a third output to the fetch engine 250 relating to these disconnect values or disconnect thresholds.

In a first example, the usage engine 245 may determine a change in a network parameter (e.g., RSSI) of the quality metric to generate a corresponding change threshold (e.g., RSSI threshold) indicative of a pattern when the UE 110 disconnects (or may disconnect) from a particular WiFi network 130. Specifically, the UE 110 may measure a first RSSI value at a first time and a second RSSI value after a period of time has passed to determine the change in the RSSI values prior to the UE 110 disconnecting from the WiFi network 130. In tracking this change in RSSI values, a disconnect threshold for a change in the RSSI values may be determined for the UE 110 corresponding to the particular WiFi network 130 on which this pattern is observed. It is noted that when the disconnect threshold for the change in the RSSI values or other network parameter is observed, the usage engine 245 may also average a plurality of disconnect thresholds for one or more WiFi networks 130 to identify an average disconnect threshold that is indicative of when the UE 110 disconnects (or may disconnect) from a WiFi network. It should be noted that the change threshold (e.g., RSSI threshold) may be based on time, e.g., a drop of RSSI threshold within a predefined period of time, or based on a threshold drop from a measured maximum for a current connection, regardless of the amount of time between the maximum and the threshold drop. It should be understood that the time dependence may or may not apply to any of the parameter thresholds that are based on a change in the value of the parameter.

In a second example, the usage engine 245 may determine a change in a position vector of the context metric relative to a distance threshold. The change in the position vector may be used to determine a disconnect threshold corresponding to the particular WiFi network 130 on which this pattern is observed in a substantially similar manner as the RSSI value disconnect threshold. That is, the position change disconnect threshold may indicate that when the UE 110 moves a particular distance within a predetermined amount of time, the UE 110 may disconnect from the associated WiFi network 130. Again, an average disconnect threshold for the position change may be determined by averaging disconnect thresholds for two or more WiFi networks 130.

In a third example, the usage engine 245 may use a combination, e.g., where a change in the quality metric is considered along with a change in the context metric. Accordingly, the usage engine 245 may identify when the UE 110 disconnects from a particular WiFi network 130 after the UE 110 has experienced a change in the RSSI value beyond the corresponding RSSI value disconnect threshold and has changed position beyond the corresponding position change disconnect threshold. In this manner, the usage engine 245 may determine more complex patterns in which a set of conditions are identified to indicate the likelihood that the UE 110 will disconnect from a particular WiFi network 130. The third example may also represent the usage engine 245 identifying any combination of two or more metrics used to identify when a disconnect from the WiFi network 130 is probable.

To illustrate a further permutation of utilizing the historical usage information, in a fourth example, a measurement of a network parameter of the quality metric may be considered. For example, when a particular measurement is determined for a given network parameter, based on historical usage patterns, there may be a likelihood that the UE 110 will disconnect from the WiFi network 130. For example, the measurement may be when the RSSI value falls beneath an RSSI disconnect threshold. The UE 110 may not experience a change in the RSSI values beyond the RSSI change disconnect threshold. Nevertheless, based on the historical usage information, when the UE 110 has an RSSI value that falls under the RSSI disconnect threshold, there may be a pattern indicating a likelihood that the UE 110 will disconnect from the WiFi network 130. Accordingly, the pattern may not necessarily be based on a change, but may alternatively (or additionally) be based on an absolute measured value.

In a fifth example, the location of the UE 110 may be considered. In a substantially similar manner as the second and fourth examples, the location alone of the UE 110 may be indicative of a pattern indicating a likelihood that the UE 110 may disconnect from the WiFi network 130. For example, when the UE 110 is disposed in a particular location, there may be an observed probability that the UE 110 will disconnect from the WiFi network 130. Thus, although the change in position may not satisfy the position change disconnect threshold, a position disconnect threshold may be satisfied.

In a sixth example, the measurement of the network parameter of the quality metric may be considered with a location of the context metric. In a substantially similar manner as the third and fourth examples, the measurement and location (along with one or more metrics) may be used as a combination indicative of a pattern indicating a likelihood that the UE 110 will disconnect from the WiFi network 130. Thus, although changes in RSSI values and position may not be satisfied individually, the measurements may satisfy a combination of a corresponding RSSI disconnect threshold and position disconnect threshold that are different from the change thresholds or absolute thresholds for the individual parameters.

In an exemplary implementation of using at least one of the above examples in determining when the disconnect may be imminent, the usage engine 245 may utilize information associated with a basic service set (BSS) of an access point of a network. The UE 110 may have information indicating which BSS is an edge BSS of the network. The information of the edge BSS along with changing link characteristics and past link changes with the BSS may be used in determining whether an imminent disconnect of a current link is likely. Two exemplary scenarios associated with this implementation will be described, where a first scenario involves a multiple access point environment (e.g., an enterprise deployment) and a second scenario involves a single access point environment (e.g., a residential deployment). The first scenario includes two exemplary use cases of using values associated with a monotonically diminishing RSSI from the edge network BSS. In a first use case, roaming may be triggered at −70 dBm and another BSS of the same network is likely to be found. In a second use case, if the RSSI falls below −75 dBm and still diminishes with one or more other link parameters worsening (e.g., a packet error rate increasing monotonically and going above 50%), a disconnect may be declared imminent. In the second scenario, roaming may be triggered at −75 dBm and, via the WiFi network, a scan may be performed to identify any other networks. Accordingly, a diminishing RSSI may be identified as well as RSSI fingerprints (e.g., a vector of RSSI from a roam scan result) from a roam scan. Based on this information, the likelihood of an imminent disconnect may be determined. Furthermore, the diminishing RSSI from −75 dBm to −85 dBm (e.g., monotonically) along with RSSI fingerprint information (e.g., matching the fingerprint to a previous, historical disconnect) may additionally indicate the likelihood of an imminent disconnect.

It is again noted that the above examples may represent any manner in which the usage engine 245 may identify patterns indicative of when the UE 110 is likely to disconnect from one or more particular WiFi networks 130, based on tracking historical usage information reflecting one or more occasions when the UE 110 has previously disconnected from the WiFi networks 130. Thus, the above examples of using RSSI and/or location are only exemplary and many additional parameters and their corresponding values may be used to determine that an imminent disconnect from the WiFi network 130 is likely. It is also again noted that the patterns for one or more particular WiFi networks 130 may also be used to determine an average pattern of use. The average pattern of use may be utilized, e.g., when historical usage information for a currently connected WiFi network 130 is not available or sufficiently robust. Any/all of the features of the pre-fetch operation according to the exemplary embodiments may still be utilized using an average pattern of use.

The usage engine 245 may also be configured with a sufficiency operation to determine when the historical usage information includes enough previous disconnect events for a particular WiFi network 130. Thus, when a sufficient number of disconnect events for a particular WiFi network 130 have been observed (e.g., a sufficiency threshold is met), the usage engine 245 may supply the appropriate threshold that may be used. In contrast, when a sufficient number of disconnect events for the particular WiFi network 130 have not been observed, the usage engine 245 may continue to track the disconnect events, but may not determine the appropriate threshold until the sufficiency threshold is met. However, it is noted that the use of the sufficiency operation and the sufficiency threshold is only exemplary. The usage engine 245 according to the exemplary embodiments may be configured to utilize the historical usage information based on any number of disconnect events (e.g., after only one event, after two events, or after a predetermined minimum number of events) to generate a threshold based on a pattern of use for the particular WiFi network 130. It is also noted that even if the sufficiency operation/threshold are used, the historical usage information for a WiFi network 130 that does not satisfy the sufficiency threshold may still be utilized in determining a threshold based on an average pattern of use. In another example, the usage engine 245 may implement a learning algorithm to determine the thresholds that indicate a disconnect may be imminent. Those skilled in the art understand that learning algorithms may be adjusted over time as more data (e.g., actual disconnects) are cataloged and the corresponding disconnect thresholds may be adjusted accordingly.

The fetch engine 250 may be configured to identify one or more select applications for which to perform the pre-fetch operation when the pre-fetch operation is triggered. The selection can be based on the outputs of any/all of the quality engine 235, the context engine 240, and/or the usage engine 245. The fetch engine 250 may also make the determination as to whether the pre-fetch operation is to be performed based on the outputs of any/all of the engines 235-245. By receiving the outputs of the engines 235-245 as well as determining other pertinent information (e.g., an identity of the network to which the UE 110 is connected), the fetch engine 250 may determine whether the pre-fetch operation is to be used.

By first determining the identity of the network, the fetch engine 250 may determine whether the network is a WiFi network 130. If the current network is not a WiFi network 130, the fetch engine 250 may determine that the pre-fetch operation is not needed. If the current network is a WiFi network 130, the fetch engine 250 may determine if the condition(s) of the UE 110 indicate that the pre-fetch operation should be performed. Based on the identity of the WiFi network 130, the fetch engine 250 may also determine whether the pre-fetch operation is to be triggered based on the output of the usage engine 245. For example, if the WiFi network 130 is a known network, the usage engine 245 may provide information based on the data of the historical usage repository 255. Alternatively, if the WiFi network 130 is unknown, the pre-fetch operation may not be used or another manner of using thresholds may be used. As noted above, an average pattern of use may be used to generate an average threshold as opposed to a particular threshold corresponding to a particular WiFi network 130. In another manner, a default threshold may be used if the historical usage information is not relied upon.

As noted above, the historical usage repository 255 may also be used to generate an average pattern of use for scenarios in which a currently connected WiFi network 130 is unknown and historical usage information is unavailable. However, if sufficient historical usage information is not available for an average pattern of use to be determined or if the average pattern of use is not a feature that is utilized, the fetch engine 250 may use a predetermined (e.g., default) threshold for WiFi networks 130 that are unknown. For example, the predetermined threshold may correspond to the quality and/or context metrics used by the UE 110. The predetermined threshold may also be configured by an administrator or user.

Once it is determined that the pre-fetch operation is to be used, the fetch engine 250 may select one or more applications for which the pre-fetch operation is to be performed. As noted above, the applications may be selected based on an automatic determination, a manual determination, or some combination thereof. With regard to the automatic determination, as described above, foreground applications may have a higher priority than background applications. Thus, the fetch engine 250 may select a predetermined number of applications for which to perform the pre-fetch operation, starting by selecting one or more qualifying foreground applications and then selecting one or more qualifying background applications if the remaining resources (e.g., opportunities and/or bandwidth) permit. If multiple foreground and/or background applications are selected, the applications may be prioritized based on one or more factors, such as which application is being used most frequently. With regard to the manual determination, the user or an administrator may indicate one or more applications (foreground and/or background) that are prioritized to have the pre-fetch operation performed and possibly a relative prioritization. It is noted that a manually determined application may take precedence over any automatically determined application. Thus, using a prioritized list of applications for which the pre-fetch operation is performed, the fetch engine 250 may request data for the selected applications in an order indicated in the prioritized list or utilize a weighted bandwidth of a total available bandwidth based on the prioritization of the selected applications.

In addition to the quality and context metrics, the historical usage repository 255 may also store information tracking how applications are used. That is, the context of the applications of the UE 110 may also be tracked. For example, the applications may have an anticipated use based on any/all of location, time, motion state, etc. Even if the application is not currently being run on the UE 110, the anticipated use based on the context metrics of the UE 110 may indicate whether the pre-fetch operation is to be performed for an application. In this manner, application context metrics may also be determined based on the data stored in the historical usage repository 255 tracking the application usage.

To provide a specific example of a pre-fetch operation being used for an application that is not currently running, it may be considered that the historical usage repository 255 includes information indicating that a map application is typically (or frequently) opened within a predetermined amount of time of the UE 110 disconnecting from a particular WiFi network 130. Thus, the pre-fetch operation may be utilized for the map application, even though it is not currently running on the UE 110. Such an anticipatory pre-fetch can be utilized for any application.

It is noted that the manner in which the pre-fetch operation is used may vary. For example, the amount of data being pre-fetched may depend on the type of application. In another example, the amount of data being pre-fetched may have a maximum threshold for the individual application or for all applications as a whole. For example, some applications may pre-fetch a relatively low amount of data (e.g., tens of kilobytes, hundreds of kilobytes, etc.) such as a news feed that may be text based or use little to no media content (e.g., images, video, etc.). In another example, some applications may pre-fetch a relatively high amount of data (e.g., tens of megabytes, hundreds of megabytes, etc.) such as a streaming application that requires blocks of media content data to be downloaded (e.g., the pre-fetch operation for a streaming application may be triggered upon a RSSI measurement being approximately −75 dBm with position change information indicating a movement out of the WiFi coverage area or a diminishing RSSI being detected such that use of the pre-fetch operation may result in approximately 4 MB of data over a 30 second duration). These examples also show that it may be possible to set different thresholds for different applications. For example, the streaming application may have a more aggressive threshold for indicating an imminent disconnection because the penalty of disconnection is higher. While the news feed application has a less aggressive threshold because if disconnection occurs, the new application will not use a large amount of bandwidth, e.g., to retrieve data on the cellular network.

The manner in which the pre-fetch operation is performed may also vary dynamically. For example, if the quality metric identifies that the current connection to the WiFi network 130 is relatively stable (e.g., capable of supporting a relatively high exchange rate), the fetch engine 250 may request larger increments (chunks) of pre-fetch data. In contrast, if the quality metric identifies a less stable connection to the WiFi network 130, the fetch engine 250 may dynamically determine to request smaller increments of pre-fetch data.

Once the pre-fetch data has been requested and received, the UE 110 may subsequently disconnect from the WiFi network 130 and establish or retain a connection to the cellular network 120. However, with the data being pre-fetched for the selected applications, the UE 110 is not required to request the same data for the selected applications over the cellular network 120, relying instead on the pre-fetched data, e.g., stored in a buffer of the memory arrangement 210. Thus, if the selected application requires the pre-fetched data at a subsequent time while connected to the cellular network 120, the UE 110 may not be required to utilize the cellular network 120 to obtain the data, thereby reducing data exchanges via the cellular network 120.

It is noted that the data that is pre-fetched may be held in the buffer of the memory arrangement 210 based on a predetermined timer. For example, the email client may have requested an update of the inbox in the pre-fetch operation. When the UE 110 has disconnected from the WiFi network 130 and established a connection to the cellular network 120, if the email client subsequently requests an update within the duration of the predetermined timer, the pre-fetched data may be used. However, if the email client subsequently requests an update after expiry of the predetermined timer, the email client may request a query to the email server. In this manner, the use of stale, pre-fetched data may be avoided.

Figure 3:
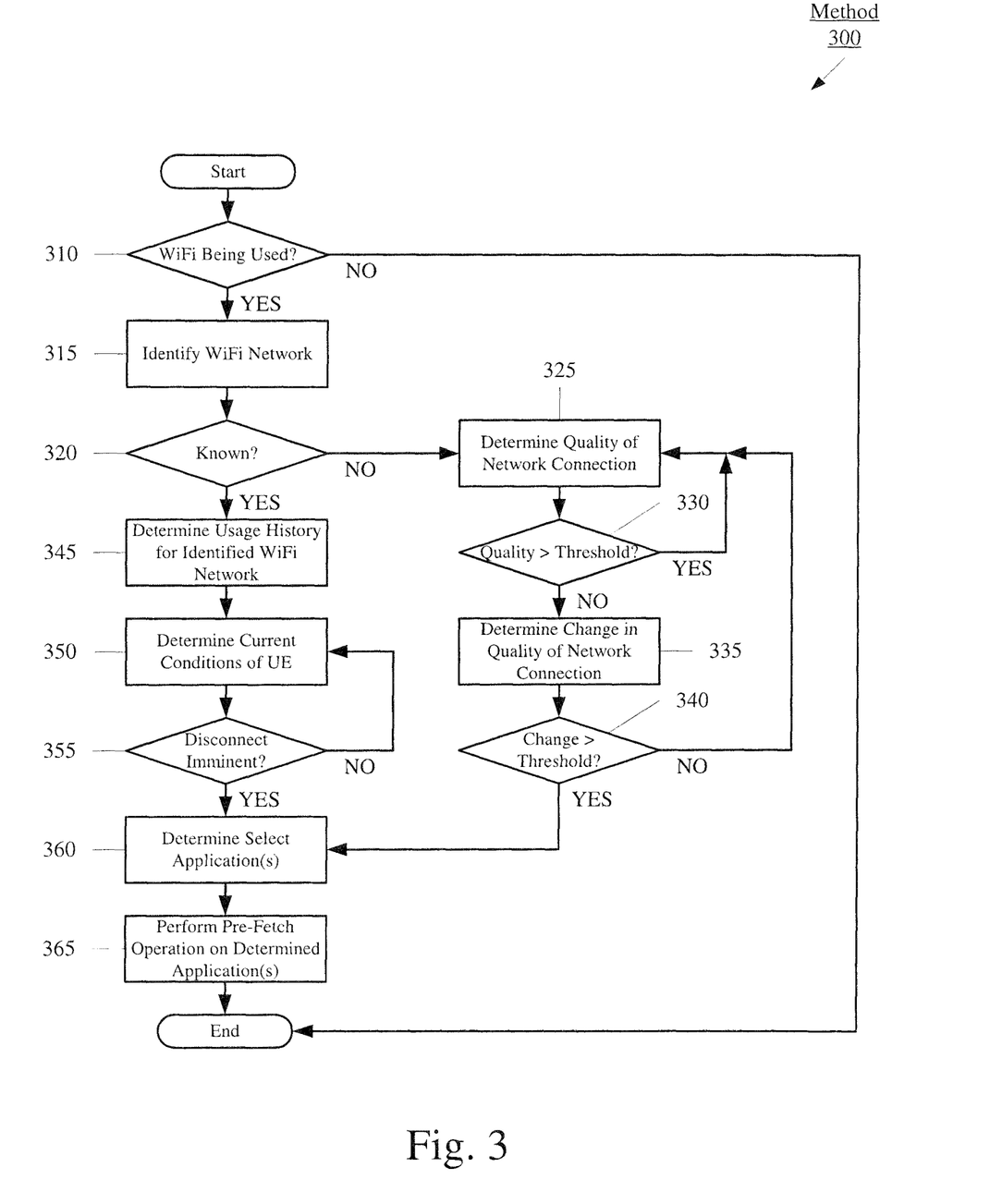
FIG. 3 shows an example method for performing a pre-fetch of data for select applications when WiFi link loss is determined to be imminent according to various exemplary embodiments described herein.

FIG. 3 shows an exemplary method 300 for performing a pre-fetch of data for select applications when a WiFi link loss is determined to be imminent, according to the various exemplary embodiments described herein. Specifically, the UE 110 may determine a plurality of quality metrics and/or context metrics (along with any historical usage information) and use a WiFi connection to pre-fetch data when a condition suggesting an imminent disconnection of the WiFi connection is determined (e.g., to be likely) or detected. The method 300 may be performed by any component or components of a wireless device, such as the quality engine 235, the usage engine 245, and/or the fetch engine 250 of the UE 110. The method 300 will be described with regard to the network arrangement 100 of FIG. 1 and the UE 110 of FIG. 2.

In 310, the UE 110 determines whether a WiFi connection is currently being used. It is noted that the UE 110 may not exclusively have a WiFi connection or a cellular connection 120. Those skilled in the art will understand that while connected to the WiFi network 130, the UE 110 may also be connected to the cellular network 120 at least in a background capacity to exchange certain types of data (e.g., control signals). If the UE 110 determines that there is no current WiFi connection, the opportunity to perform the pre-fetch operation according to the exemplary embodiments using the WiFi connection is not available. Thus, the method 300 will end (or be reevaluated in the future). However, if the UE 110 identifies an existing connection to the WiFi network 130, the UE 110 continues to 315.

In 315, the UE 110 identifies the currently connected WiFi network 130. The currently connected WiFi network 130 may be identified by any associated identifier or other such means (e.g., BSSID, name, location, etc.). Thus, in 320, the UE 110 determines whether the WiFi network 130 to which the UE 110 is currently connected is a known network. Specifically, the UE 110 may determine whether the WiFi network 130 includes any historical usage information stored in the historical usage repository 255. If the UE 110 identifies the WiFi network 130 as an unknown network, the UE 110 continues from 320 to 325. However, if the UE 110 identifies the WiFi network 130 as a known network, the UE 110 continues from 320 to 345.

When the WiFi network 130 is an unknown network, in 325, the UE 110 may determine a quality of the network connection with the unknown WiFi network 130. For example, the quality engine 235 may provide one or more quality metrics identifying the quality of the network connection. In some implementations, the quality engine 235 may provide an output of an RSSI measurement. However, as described above, any network parameter that indicates a quality of the connection may be used. In 330, the UE 110 determines whether the quality of the network connection is above a predetermined disconnect threshold. As noted above, the predetermined disconnect threshold associated with unknown WiFi networks 130 may be based on different standards. In a first example, the predetermined disconnect threshold may be a predefined threshold from the user or administrator. In a second example, the predetermined disconnect threshold may be an average disconnect threshold, e.g., based on the historical usage information stored in the historical usage repository 255. In other examples, the predetermined disconnect threshold may be based on a level of signal quality above a minimum value to maintain a connection. If the quality of the network connection to the unknown WiFi network 130 is at least the predetermined disconnect threshold, the UE 110 may determine that a disconnect from the unknown WiFi network 130 is not likely imminent. Accordingly, the UE 110 may return to 325 to continue monitoring the quality of the network connection. However, if the quality of the network connection to the unknown WiFi network 130 is less than the predetermined disconnect threshold, the UE 110 may determine that further analysis is required and continues to 335.

In 335, the UE 110 may determine a change to the quality of the network connection with the unknown WiFi network 130 over a predetermined period of time relative to when a last quality measurement is determined. For example, the quality engine 235 may provide a quality metric identifying the change in the quality of the network connection. Specifically, the quality engine 235 may provide an output of a change to the RSSI measurement over time. In 340, the UE 110 determines whether the change in quality of the network connection is above a predetermined disconnect threshold. Again, the predetermined disconnect threshold associated with unknown WiFi networks 130 may be based on one or more different standards (e.g., predefined or historically based). If the change in the quality of the network connection to the unknown WiFi network 130 is less than the predetermined disconnect threshold, the UE 110 may determine that a disconnect from the unknown WiFi network 130 is not likely imminent. Accordingly, the UE 110 may return to 325 to continue monitoring the quality of the network connection. However, if the change in the quality of the network connection to the unknown WiFi network 130 at least satisfies the predetermined disconnect threshold, the UE 110 may determine that a disconnect from the unknown WiFi network 130 is likely imminent, triggering the pre-fetch operation. Accordingly, the UE 110 may continue to 360. It is noted that the comparison of a change in the quality of the network connection to a predetermined disconnect threshold is only exemplary. In other exemplary embodiments, the method 300 may utilize an average quality in the network connection over a predetermined period of time. This average quality may be measured against a corresponding predetermined disconnect threshold. In further exemplary embodiments, the method 300 may utilize an instantaneous quality associated with the network connection, e.g., at the end of a predetermined period of time. This instantaneous quality may be measured against a corresponding predetermined disconnect threshold.

It is noted that the above mechanism from 325 to 340 for when the WiFi network 130 is an unknown network is only exemplary. That is, the above mechanism relating to using only the quality of the network connection in determining use of the pre-fetch operation is only exemplary. As described in detail above, in other implementations, the UE 110 may utilize one or more different and/or additional factors and/or considerations, even when the WiFi network 130 to which the UE 110 is currently connected is unknown. For example, context information such as one or more of location, change in position, time, etc. may be considered when determining if the pre-fetch operation is to be used.

It is also noted that the above mechanism using the first disconnect threshold based on a quality measurement of a network parameter and a second disconnect threshold based on a quality change of the network parameter is only exemplary. For example, especially when historical usage information is used, a measurement alone or a change alone may be used as the basis of determining when the pre-fetch operation is performed. For example, the operations 325 and 330 may be performed in parallel with the operations 335 and 340 such that if either indicates likelihood of an imminent disconnect, the method may proceed to operation 360.

Returning to 320 when the UE 110 determines that the WiFi network 130 is a known network, in 345, the UE 110 determines the historical usage information associated with the known WiFi network 130. As described above, the historical usage information may indicate one or more specific thresholds that are to be used in determining whether an imminent disconnect from the known WiFi network 130 is likely. In 350, the UE 110 determines one or more current conditions, including any/all of the quality conditions of the network connection and/or any/all of the context conditions of the UE 110. Thus, the quality metric and/or the context metric from the historical usage information of the known WiFi network 130 may provide an appropriate threshold for comparison to the one or more current conditions.

In 355, the UE 110 determines whether an imminent disconnect from the known WiFi network 130 is likely based on the historical usage information and the one or more current conditions. For example, the historical usage information may indicate that when only a quality metric is met, an imminent disconnect is likely. In another example, the historical usage information may indicate that when only a context metric is met, an imminent disconnect is likely. In a further example, the historical usage information may indicate that when a combination of one or more of the quality metrics and/or one or more of the context metrics is met, an imminent disconnect is likely. If an imminent disconnect from the known WiFi network 130 is not likely, the UE 110 returns to 350 to continue monitoring the current conditions of the UE 110. However, if an imminent disconnect from the known WiFi network 130 is likely, the UE 110 to continues to 360.

In 360, the UE 110 selects the one or more applications for which the pre-fetch operation is to be performed. As described above, the UE 110 may utilize a relative priority of the applications currently running (e.g., in foreground or background) that utilize the network connection or are likely to be run and use the network connection (e.g., based on application context historical information). When one or more applications are selected, in 365, the UE 110 performs the pre-fetch operation in which data is requested (e.g., as indicated by the application) from the corresponding network source for the one or more respective applications selected. As noted above, the data that is pre-fetched may be stored in a buffer until the pre-fetched data is requested or until the expiry of a timer.

It is again noted that the use of the WiFi network 130 and cellular network 120 is only exemplary, and any higher and lower data exchange rate (or cost, etc.) connection may be used. Thus, for example, the method 300 described above may determine whether the UE 110 is configured to establish a connection with a lower rate of data exchange than a currently established connection. If the UE 110 is configured with such a feature, the method 300 may be used. Further, one or more factors other than the rate of data exchange can be use, such as cost, power, etc. Additionally, the method 300 may determine if the UE 110 is likely to imminently disconnect from a network such that the pre-fetch operation is to be used (regardless of if another connection is subsequently established).

The exemplary embodiments provide a device, system, and method of performing a pre-fetch operation of data for one or more select applications when loss of a link (or connection) to a network is likely to be imminent. For example, when a UE is currently connected to a WiFi network and a disconnect of this network connection is likely to be imminent, the UE may utilize the pre-fetch operation to request data for the one or more select applications. In the scenario where the UE subsequently establishes a connection to, e.g., a lower data exchange rate network such as a cellular network, the use of the pre-fetch operation may opportunistically take advantage of, e.g., the existing higher data exchange rate over the WiFi network.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
   at a device that has a current first network connection to a first network:
   determining a context of the device based on at least one of a change in position of the device or a relative position of the device;
   determining a quality of the first network connection based on a measured parameter of the first network connection;
   determining whether a disconnect of the first network connection is imminent based on the quality of the first network connection and the context of the device; and
   responsive to determining that the disconnect is imminent, performing a pre-fetch operation to request data over the first network connection for at least one application resident on the device, wherein increments of data to be pre-fetched in the pre-fetch operation is based on the quality of the first network connection.

2. The method of claim 1, wherein the quality of the first network connection comprises at least one of a measurement of a network parameter or a Layer 2 statistic.

3. The method of claim 1, wherein the context of the device further comprises at least one of a location of the device, or a current time.

4. The method of claim 1, further comprising:
   selecting a first application for which the pre-fetch operation is to be performed.

5. The method of claim 4, further comprising:
   selecting a second application for which the pre-fetch operation is to be performed;
   determining a first priority of the first application and a second priority of the second application, the first and second priorities indicating an order in which to request data for the first and second applications using the pre-fetch operation.

6. The method of claim 5, wherein the first application is a foreground application and the second application is a background application, the first priority being higher than the second priority.

7. The method of claim 1, wherein the pre-fetch operation is performed prior to establishing a second network connection to a second network, the second network providing a lower data exchange rate than the first network.

8. The method of claim 1, wherein determining whether the disconnect is imminent comprises,
   comparing the measured parameter to a first threshold, wherein the disconnect is imminent when the measured parameter satisfies the first threshold,
   comparing the change in position of the device or relative position of the device to a second threshold, wherein the disconnect is imminent when the change in position satisfies the second threshold, or
   comparing the measured parameter to a third threshold that is different than the first threshold and comparing the change in position of the device or relative position of the device to a fourth threshold that is different than the second threshold, wherein the disconnect is imminent when the measured parameter satisfies the third threshold and the change in position satisfies the fourth threshold.

9. The method of claim 8, further comprising:
   determining whether a historical usage repository includes historical usage information corresponding to the first network.

10. The method of claim 9, further comprising:
    when the historical usage repository includes the historical usage information, determining the first, second, third or fourth thresholds based on the historical usage information.

11. The method of claim 9, further comprising:
    when the historical usage repository does not include the historical usage information, determining the first, second, third or fourth thresholds based on further historical usage information in the historical usage repository associated with one or more further networks.

12. The method of claim 9, further comprising:
    when the historical usage repository does not include the historical usage information, identifying default values for the first, second, third or fourth thresholds.

13. A device, comprising:
    a transceiver configured to establish a first network connection to a first network; and
    a processor configured to determine a quality of the first network and a context of the device, wherein the quality comprises a measured parameter of the first network connection and the context of the device comprises at least one of a change in position of the device or a relative position of the device, the processor being further configured to determine whether a disconnect of the first network connection is imminent based on the quality of the first network connection and the context of the device, wherein determining whether the disconnect is imminent comprises, comparing the measured parameter to a first threshold, comparing the change in position of the device or relative position of the device to a second threshold, wherein the disconnect is imminent when the measured parameter satisfies the first threshold and the change in position satisfies the second threshold, determined to be imminent, the processor being further configured to perform a pre-fetch operation to request data over the first network connection for at least one application executing on the device.

14. The device of claim 13, wherein the quality of the first network connection comprises at least one of a measurement of a network parameter or a Layer 2 statistic.

15. The device of claim 13, wherein the context of the device further comprises at least one of a location of the device, or a current time.

16. The device of claim 13, further comprising:
a memory arrangement storing a historical usage repository,
wherein the processor determines whether the historical usage repository includes historical usage information corresponding to the first network.

17. The device of claim 13, wherein the processor selects an application for which the pre-fetch operation is to be performed.

18. The device of claim 13, wherein the transceiver includes a WiFi chipset and a cellular chipset, wherein the first network is a WiFi network, and wherein the processor performs the pre-fetch operation prior to establishing a second network connection to a second network, the second network being a cellular network.

19. A processor configured to perform operations comprising:
determining a quality of a first network connection and a context of the device, wherein the quality comprises a measured parameter of the first network connection and the context of the device comprises at least one of a change in position of the device or a relative position of the device;
determining whether a disconnect of the first network connection is imminent based on the quality of the first network connection and the context of the device, wherein determining whether the disconnect is imminent comprises,
comparing the measured parameter to a first threshold; and
responsive to determining that the disconnect of the first network connection is imminent, performing a pre-fetch operation to request data over the first network connection for at least one application executing on the device, wherein increments of data to be pre-fetched in the pre-fetch operation is based on the quality of the first network connection.

20. The processor of claim 19, wherein the context of the device further comprises at least one of a location of the device, or a current time.

* * * * *